United States Patent
Rosenberg et al.

(10) Patent No.: US 6,732,134 B1
(45) Date of Patent: May 4, 2004

(54) HANDLER FOR FLOATING-POINT DENORMALIZED NUMBERS

(75) Inventors: Alexander Rosenberg, Saratoga, CA (US); Ali Sazegari, Cupertino, CA (US)

(73) Assignee: Apple Computer, Inc., Cupertino, CA (US)

( * ) Notice: Subject to any disclaimer, the term of this patent is extended or adjusted under 35 U.S.C. 154(b) by 606 days.

(21) Appl. No.: 09/659,747

(22) Filed: Sep. 11, 2000

(51) Int. Cl.[7] .................................................. G06F 7/38
(52) U.S. Cl. ........................................ 708/495; 708/502
(58) Field of Search ................................ 708/495–498, 708/502, 654

(56) References Cited

U.S. PATENT DOCUMENTS

| | | | |
|---|---|---|---|
| 5,267,186 A | | 11/1993 | Gupta et al. |
| 5,943,249 A | * | 8/1999 | Handlogten ............... 708/496 |
| 5,966,085 A | | 10/1999 | Van Dyke-Lewis et al. |
| 6,131,106 A | * | 10/2000 | Steele, Jr. ................. 708/510 |
| 6,219,684 B1 | * | 4/2001 | Saxena et al. ............. 708/496 |
| 6,240,338 B1 | * | 5/2001 | Peterson .................... 708/654 |

OTHER PUBLICATIONS

Cornea–Hasegan, Marius et al, "*IA–64 Floating–Point Operations and the IEEE Standard for Binary Floating–Point Arithmetic*", Intel Technology Journal Q4, 1999, pps 1–16.

* cited by examiner

Primary Examiner—Tan V. Mai
(74) Attorney, Agent, or Firm—Burns, Doane, Swecker & Mathis, L.L.P.

(57) ABSTRACT

Operations that involve denormalized numbers are handled by restructuring the input values for an operation as normalized numbers, and performing calculations on the normalized numbers. As a first step in the process of performing an operation, a determination is made whether input values for the operation contain one or more denormalized numbers. For certain types of operations, a determination is made whether the input values are such that the output value from the operation will be a denormalized number. For each operation in which either the input values or output values comprise a denormalized number, the input values are scaled to produce values that are not denormalized. Once the appropriate factoring has been carried out, the requested operation is performed, using normalized numbers, to produce an intermediate result which is then adjusted to account for the initial scaling.

44 Claims, 3 Drawing Sheets

HANDLER FOR FLOATING-POINT DENORMALIZED NUMBERS

FIELD OF THE INVENTION

The present invention is generally directed to numerical operations that are performed in computers, and more particularly to a software-based implementation of a handler for operations that are performed upon floating-point denormalized numbers.

BACKGROUND OF THE INVENTION

One of the principle attributes of computers is their ability to perform mathematical functions and other types of numerical operations in a rapid manner. The computer's ability to quickly handle large numbers of mathematical calculations makes it possible to filter, or otherwise process, a wide variety of different types of data. Some applications require the computers to process numbers having very large magnitudes, whereas other applications require the ability to work with infinitesimally small data values that are several orders of magnitude less than one. Hence, depending upon the particular application in which they are used, computers may be required to deal with numbers that span the entire spectrum from zero to infinity, for both positive and negative values.

One issue that arises in connection with this need to handle numbers over such a large range is the manner in which the numbers are represented in the memory of the computer. Typically, when a numerical operation is being performed, the data values that pertain to the operation are stored in registers. Each register has a fixed size, e.g., 32 bits or 64 bits. Consequently, all data values that might be encountered by the computer must be capable of being reliably stored in a register of the designated size, regardless of their magnitudes. To address this issue, a standard has been promulgated for a binary numerical format. This standard, known as the ANSI/IEEE Standard 754-1985 for Binary Floating-Point Arithmetic, describes a 32-bit format and a 64-bit format for the representation of numerical values.

According to the IEEE standard, numerical values are represented in a signed exponential format. Referring to the 32-bit format, for example, the first bit represents the sign of the number. The next eight bits indicate the exponential value for the number, and the final twenty-three bits comprise the value of the significand, or mantissa, of the number. The number of bits that are allocated to the exponent defines the range of numbers that can be represented. For instance, eight bits enable numbers in the range of $2^{-126}$ to $2^{127}$ to be represented. The number of bits that are allocated to the significand determine the precision with which the number can be represented. To increase this precision by one additional bit, the IEEE standard specifies that the number should be normalized, so that the most significant bit of the significand always has a value of one. In this case, since the value of the most significant bit is always known, it can remain implicit, and need not be stored in the register. Hence, by normalizing the numbers, they can be represented with an accuracy of 24 bits in the significand.

However, when normalized numbers are employed, values that lie in a range close to zero cannot be represented. This is due to the fact that there is a lower bound on the value of the exponent, which is imposed by the number of bits that are allocated to the representation of the exponent. For instance, if 8 bits are assigned to the exponent, the smallest value for the exponent is typically –126. As a result, where the most significant bit of the significand has a value of one, the range of numbers that cannot be represented with normalized values is about $\pm 10^{-38}$ to $10^{-45}$ in decimal notation.

Certain types of applications require numerical operations to be performed which could result in values that fall within this range. For example, ray tracing and digital signal processing for audio signals can utilize extremely small-valued numbers. The results of certain operations on these numbers, such as subtraction or division, may be so small that they cannot be reliably represented in a normalized format. This presents a situation known as underflow. In such a case, the results may be stored as the next lowest value that can be reliably represented, usually zero. Typically, many processors employ this type of operation, which is known as "flush to zero", as a default mode of operation when underflow occurs. However, the inaccuracy inherent in this type of operation can bring about extremely adverse consequences. For instance, if a number is to be used as a divisor or an exponent value in a subsequent calculation, using zero instead of the exact value for the number leads to undesirable results.

To accommodate this need to represent small values near zero, the IEEE standard supports operations that are carried out with "denormalized" numbers, i.e., numbers whose significand do not have an implicit one in the most significant bit position. According to the standard, these denormalized numbers are represented with an exponent value that is all zeroes, and a significand which is non-zero. By permitting numbers to be represented in this manner, the standard enables numerical operations to be carried out with values that fall in a range that is much closer to zero, albeit with less precision than normalized numbers. With this capability, small-valued numbers can be used in operations which yield even smaller results, such as subtraction and division, without being automatically flushed to zero. This ability to represent successively smaller numbers is known as "gradual underflow".

In the past, numerical operations which employed denormalized numbers were typically performed by a hardware device incorporated into the arithmetic logic unit of a processing system. Some processing systems, however, do not include a denormal processor. For example, some types of vector processing engines, which have the ability to operate upon multiple arrays of data values with a single instruction, do not contain denormal processors. In these processing engines, therefore, the default mode of operation is to flush to zero when extremely small-valued results are returned from an operation. As noted above, however, this type of result can lead to undesirable consequences. Accordingly, it is desirable to provide a software implementation of gradual underflow for processing systems which do not include hardware that is designed to handle operations on denormalized numbers.

SUMMARY OF THE INVENTION

In accordance with the present invention, operations that involve denormalized numbers are handled by restructuring the input values for an operation as normalized numbers, and performing calculations on the normalized numbers. As a first step in the process of performing an operation, a determination is made whether input values for the operation contain one or more denormalized numbers. For certain types of operations, a determination is made whether the input values are such that the output value from the operation will be a denormalized number. For each operation in which either the input values or output values comprise a denormalized number, the input values are scaled to produce values that are not denormalized. In one embodiment of the invention, this scaling is carried out by counting the number of leading zeroes in the significand of an input value. Once the appropriate factoring has been carried out, the requested operation is performed, using normalized numbers.

Hence, the same instructions can be used for both normalized and denormalized numbers, avoiding the need to create a specialized set of instructions for denormalized numbers.

As a further feature of the invention, denormalized numbers are handled in a vector processing engine together with other types of values. If a vector contains a mixture of denormalized numbers, normalized numbers and perhaps other special values, the denormalized numbers are first identified, and scaled. Once the scaling is complete, all of the values in the vector are processed, using conventional operations for normalized numbers. Thereafter, the results obtained from the scaled denormalized numbers are adjusted in accordance with the original scaling, to produce the final result.

Further features of the invention, and the advantages achieved thereby, are described in greater detail hereinafter, with reference to exemplary embodiments illustrated in the accompanying figures.

DETAILED DESCRIPTION

The present invention is directed to a software solution for computer processors that do not include an integral hardware component for handling denormalized floating-point numbers. In one embodiment thereof, the present invention has particular applicability to vector processing engines, which may not include a processor for denormalized numbers as part of the engine. To facilitate an understanding of the invention, therefore, occasional reference is made to the implementation of the invention in such an environment. Further, illustrative examples are given in which numbers are represented in a 32-bit format. It will be appreciated by those of ordinary skill in the art, however, that this embodiment is not the only practical application of the concepts which underlie the invention. Rather, the invention will find utility in any processing system which does not include a mechanism for internally processing operations that are performed upon denormalized numbers.

Figure 1:
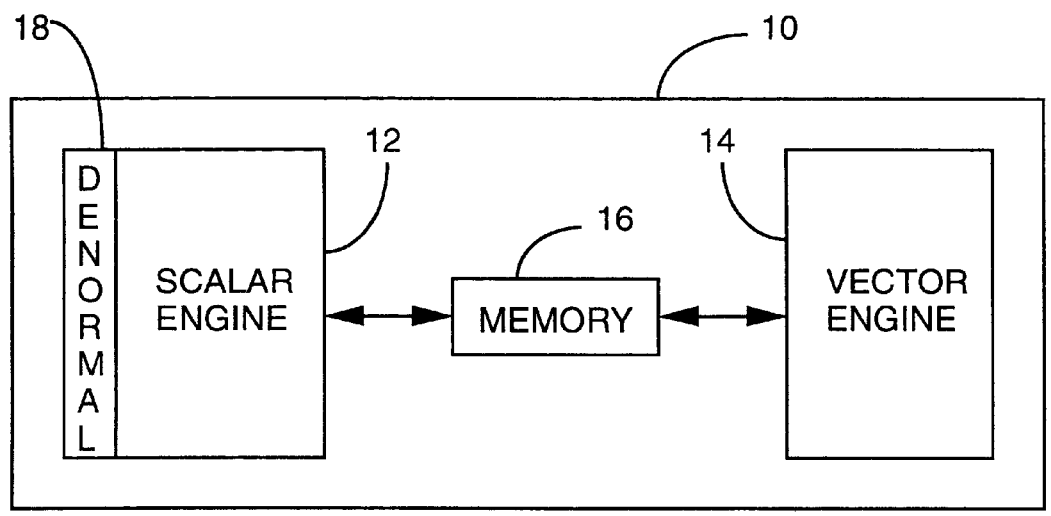
FIG. 1 is a general block diagram of a vectorized processing system in which the present invention can be employed.

FIG. 1 is a block diagram of one example of a processing system in which the present invention can be utilized. This figure depicts a system 10 which includes a scalar floating point engine 12, and a vector floating point engine 14. The scalar engine 12 performs operations on a single set of data at a time, and hence is capable of producing one output value per operation. Conversely, the vector engine 14 operates upon arrays of data, and is therefore capable of producing multiple output results at once. For example, the vector processor 14 may contain registers which are each 128 bits in length. If values are represented in a 32-bit format, each register is capable of containing a vector of four data values. The vector processor operates upon these four data values simultaneously, for example adding them to a vector of four other data values in another register, to produce four output values at once.

A memory 16 is accessible by both the scalar and vector processing engines, and can be used to transfer data between them, as well as to other system components (not shown). For example, some operations are not capable of being carried out in a vectorized manner. In this situation, the input data values for such operations are transferred from the vector engine 14 to the memory 16. These data values are serially retrieved from the memory by the scalar processor 12, which performs the requested operation on one element of the input data vector at a time. The results of these scalar operations are stored in the memory 16, where they can be retrieved by the vector processor 14 to perform further operations.

It can be seen that, each time an operation must be performed in the scalar processor, the overall efficiency of the processing system suffers. First, the number of operations required to process a set of data increases by a factor of N, where N is the number of data values contained in a vector, e.g. four in the example given above. The efficiency is further diminished by the need to transfer data between the vector processor 14 and the scalar processor 12, via the memory 16. Hence, to maintain efficiency, it is desirable to be able to perform as many operations as possible within the vector processor 14.

One area in which vectorized processing has not been generally employed is the handling of denormalized numbers. Typically, scalar processing engines include an integral hardware component 18 which is dedicated to the processing of denormalized numbers. However, most vectorized processors do not contain corresponding hardware. In these types of processors, when denormalized values are encountered, the default mode of operation is to flush to zero. Depending upon the particular application of the processor, however, the error resulting from such a mode of operation can be quite significant. For example, in the processing of digital audio signals, the fading of a sound can be accomplished by successively dividing the magnitude of the sound by two. This provides a gradual reduction in the sound that is pleasing to the listener. However, once the magnitude value approaches the minimum limit for a normalized number, a subsequent division by two will result in the magnitude value being flushed to zero. This may result in an abrupt termination of the sound being reproduced, which can be discernable to the listener. Accordingly, in these type of applications, it is preferable to provide a gradual reduction in the magnitude value, through the handling of denormalized numbers.

Figure 2:
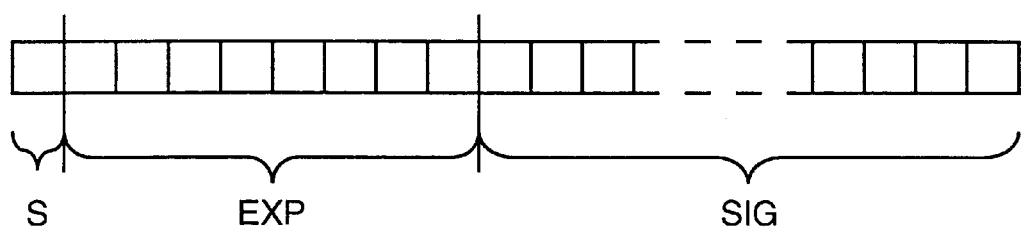
FIG. 2 illustrates the manner in which a number is represented in a 32-bit register.

FIG. 2 illustrates the manner in which a number is stored in a 32-bit register. The first bit S of the register indicates the sign of the number, where 0 represents a positive number and 1 represents a negative number. The next eight bits EXP represent the exponent for the number, in base 2. Typically, the exponent is expressed in a biased format, to avoid the need for a sign bit in the stored exponent. This objective is achieved by adding a predetermined value, know as the bias value, to the actual value of the exponent. In the example of FIG. 2, where the exponent is assigned eight bits, the bias value is equal to 127. To determine the actual exponent for a number, the bias value is subtracted from the stored exponent value. Hence, an eight-bit value can be used to represent exponents in the range from +127 to −126.

The final twenty-three bits SIG of the register are allocated to the fractional part of the significand. Since the most significant bit of the significand is implicitly a one when the number is normalized, the value represented by the data stored in the register is determined as follows:

$$(-1)^s 2^{(EXP-127)} \times 1.SIG$$

A normalized number is indicated by a value for EXP which is non-zero. If EXP is all ones and SIG is all zeroes, this number is treated as infinity. If the stored exponent value EXP is zero, the number is denormalized, in which case its value is determined as follows:

$$(-1)^s 2^{-126} \times 0.SIG$$

In the 64-bit format, the exponent is allocated eleven bits, and the fractional portion of the significand is represented with 52 bits. The bias value for the exponent is 1023 in this case.

Table 1 below illustrates how a value $A_n$ becomes progressively denormalized as it is repeatedly divided by two, with rounding to the nearest representable value. This process is known as gradual underflow. In the table, values $A_0$ and $A_1$ are normalized, whereas $A_2$–$A_{25}$ are denormalized.

| $A_n$ | Binary Value | Stored exponent |
|---|---|---|
| $A_0$ | 1.100 1100 1100 1100 1100 1101 × $2^{-125}$ | 2 |
| $A_1 = A_0/2$ | 1.100 1100 1100 1100 1100 1101 × $2^{-126}$ | 1 |
| $A_2 = A_1/2$ | 0.110 0110 0110 0110 0110 0110 × $2^{-126}$ | 0 |
| $A_3 = A_2/2$ | 0.011 0011 0011 0011 0011 0011 × $2^{-126}$ | 0 |
| $A_4 = A_3/2$ | 0.001 1001 1001 1001 1001 1010 × $2^{-126}$ | 0 |
| . | . | . |
| . | . | . |
| $A_{23} = A_{22}/2$ | 0.000 0000 0000 0000 0000 0011 × $2^{-126}$ | 0 |
| $A_{24} = A_{23}/2$ | 0.000 0000 0000 0000 0000 0010 × $2^{-126}$ | 0 |
| $A_{25} = A_{24}/2$ | 0.000 0000 0000 0000 0000 0001 × $2^{-126}$ | 0 |
| $A_{26} = A_{25}/2$ | 0.0 | 0 |

In a processor which does not have the capability to handle denormalized numbers, each of the values $A_2$–$A_{25}$ are flushed to zero, by default. However, this action can provide undesirable results if these values are then used for further calculations. For example, each of the functions $\log_2(x)$, $2^x$, $$\frac{1}{\sqrt{x}} \text{ and } \frac{1}{x}$$

will yield undesirable results if x is a denormalized number that is flushed to zero. In accordance with the present invention, such results are avoided by transforming the denormalized numbers into normalized values, which are then capable of being processed in the usual manner by the processor, and then adjusted as appropriate to account for the transformation.

In general, the transformation of the denormalized numbers into normalized values for processing purposes is accomplished by scaling the number of interest so that it can be represented as two or more normalized values, and performing the required operation on these values. The scaling operation is carried out with reference to the number of leading zeroes in the significand of the denormalized number. In such a case, a denormalized number x can be represented as a function of a normalized number y as follows:

$$x = (2^{-s})y \qquad (1)$$

where s is the number of leading zeroes in the significand of x. In this relationship, y has a value in the range 0<y<2. The value for y is not equal to 2, because in that case x would be the smallest representable normalized number. Likewise, y cannot be equal to 0, since that means x would also be zero, which is an exact value that is also not denormalized.

Once the denormalized value is factored into normalized values, the desired operation can be carried out on these normalized values within the vector processor 14 to produce the intended result. For example, the reciprocal of the square root of x is computed as follows:

$$\frac{1}{\sqrt{x}} = \frac{1}{\sqrt{(2^{-s})y}} \qquad (2)$$

$$\frac{1}{\sqrt{x}} = \frac{1}{\sqrt{2^{-s}}} \cdot \frac{1}{\sqrt{y}} \qquad (3)$$

At this point, the reciprocal square root is determined by calculating the value for $$\frac{1}{\sqrt{y}}$$

in the vector processing engine, since y is a normalized number. This operation produces an intermediate result, which is then adjusted to account for the original scaling, to yield a final result. This adjustment is performed by multiplying the intermediate result with the value of the reciprocal of the square root of $2^{-s}$. The value $2^{-s}$ is also a normalized number, and therefore the reciprocal of its square root can be calculated in the vector processing engine as well. More particularly, in a 32-bit format, the smallest value that can be represented by $2^{-s}$ is $2^{-23}$ since, as shown in Table 1, the smallest denormalized number can have, at most, 23 leading zeroes, even when the implicit value for the most significant bit is included. Since this value lies well outside of the denormalized range, it can be processed within the vector processing engine. The product of these two calculations therefore provides a reliable estimate of the value for the reciprocal square root of x, even when x is a denormalized number.

A similar approach can be used t6 calculate the value for the reciprocal function, $$\frac{1}{x},$$

when x is a denormalized value. Prior to converting the value of x to a function of a normalized number when this operation is called, however, it is useful to determine whether it falls below a limit where such a conversion has a practical result. More particularly, in a 32-bit implementation, any value for x which is less than $2.938736 \times 10^{-39}$ will return a result that is equal to infinity after normal rounding. Thus, for any number smaller than this value, the conversion process can be skipped, and the result directly returned. If the value of the denormalized number is greater than this limit, the reciprocal is calculated as follows:

$$\frac{1}{x} = \frac{1}{\sqrt{(2^{-s})y}} \tag{4}$$

$$= \frac{1}{2^{-s}} \cdot \frac{1}{y} \tag{5}$$

$$= 2^s \cdot \frac{1}{y} \tag{6}$$

Hence, an intermediate result is calculated by determining the value for $$\frac{1}{y},$$

which can be performed in the vector processing engine since it is a normalized number. This value is then scaled by the factor $2^s$ to produce the final result. This scaling is readily accomplished in binary format by shifting the result to the left, i.e. to higher values, a number of times equal to s.

In addition to the situation in which the input value for the reciprocal function is a denormalized number, an alternative possibility is that the output value is a denormalized number. In the 32-bit format, this situation occurs whenever the value of x is greater than $8.507060 \times 10^{37}$. If this limit is exceeded, then the value of x is scaled downwardly by a factor which is a power of two. The reciprocal of this reduced number is then calculated by the vector processing engine, and rescaled appropriately, as follows:

$$x = 2^n((2^{-n})x) \tag{7}$$

$$\frac{1}{x} = \frac{1}{2^n((2^{-n})x)} \tag{8}$$

$$= \frac{1}{2^n} \cdot \frac{1}{(2^{-n})x} \tag{9}$$

$$= 2^{-n} \cdot \frac{1}{(2^{-n})x} \tag{10}$$

where n is an integer. The value for n should be large enough to ensure that $(2^{-n})x$ is less than the upper limit noted previously.

Figure 3:
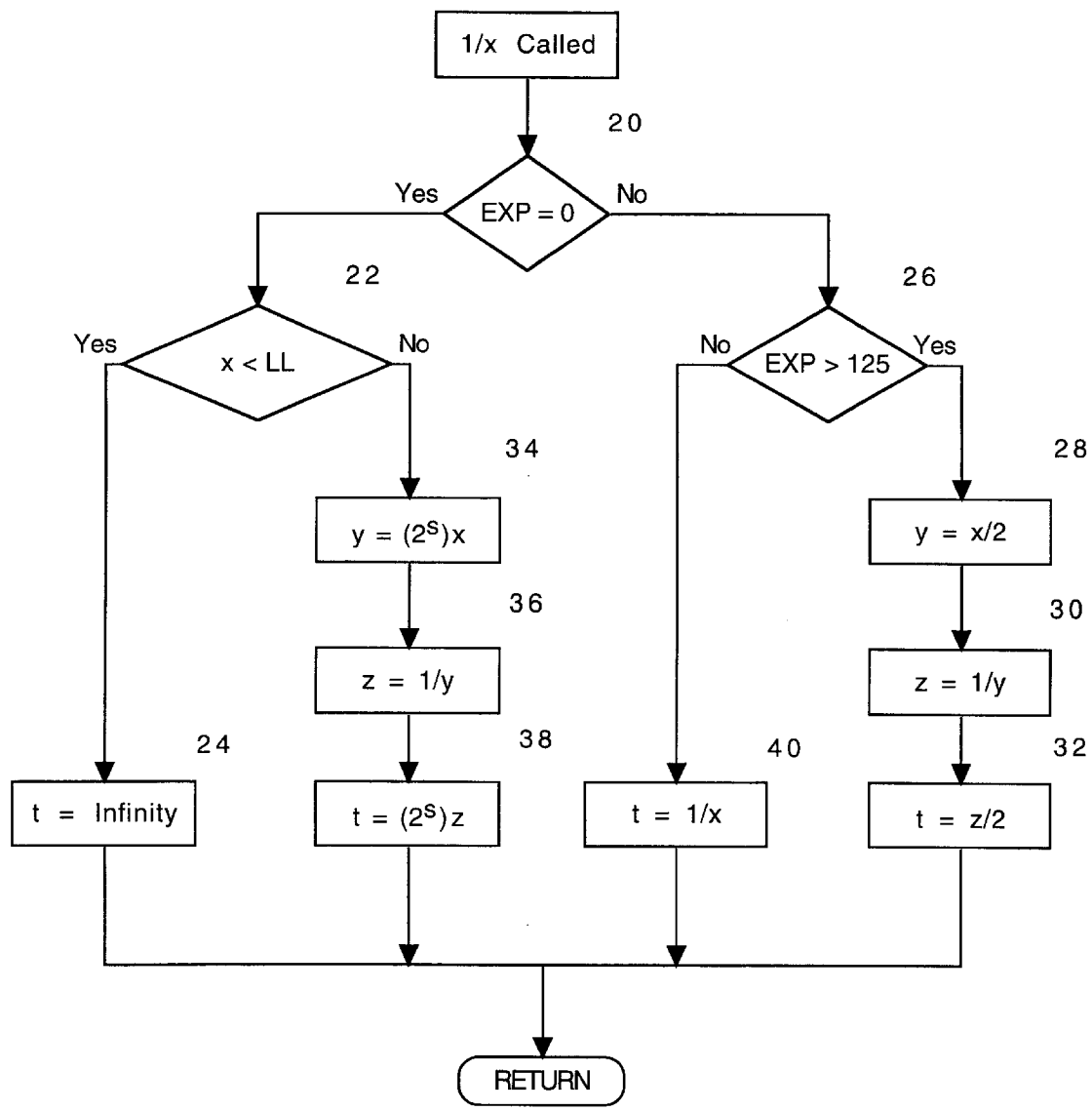
FIG. 3 is a flowchart illustrating one example of the invention in the context of the reciprocal function.

A flowchart which illustrates the foregoing process for determining the reciprocal of a value is illustrated in FIG. 3. Referring thereto, the procedure in this flowchart is initiated when an instruction is issued to compute the reciprocal of a value, x. At Step 20, x is checked to see whether it is a denormalized number, e.g. by determining whether its exponent has a value of zero. When x is a denormalized number, a determination is made at Step 22 whether the value of x is less than a lower limit LL, e.g. $2.938736 \times 10^{-39}$. If so, a result of infinity is immediately returned at Step 24. This result has the same sign as the sign of x.

If x is determined not to be a denormal number at Step 20, a determination is made at Step 26 whether x exceeds the upper limit. In this example, such a determination is made by examining whether the unbiased exponent for x has a value greater than 125. If the value of x exceeds the upper limit, x is scaled down by a factor of 2 at Step 28, and the reciprocal of this value is calculated at Step 30. This result is then scaled downwardly by the factor of 2, to produce the final result t which is returned at Step 32.

If x is a denormalized number which is greater than the lower limit, the value for y is determined in Step 34, and a reciprocal of y is calculated at Step 36. This result is then shifted to the left s times, to thereby scale it by a factor of $2^s$, which is then returned as the result t at Step 38.

If x is not a denormalized number and it is not so large that the output is a denormalized number, the reciprocal operation is carried out in the usual manner, at step 40.

To compute the value for $\log_2(x)$, a similar procedure is employed when x is a denormalized number. Again, x is factored into a product of two normal values, as follows:

$$\log_2(x) = \log_2(2^{-s} \cdot y) \tag{11}$$

$$= \log_2(2^{-s}) + \log_2(y) \tag{12}$$

$$= -s + \log_2(y) \tag{13}$$

Hence, the log function is computed by determining an intermediate value, $\log_2(y)$, and then subtracting the value s from the intermediate value. Since y is a normalized number, its log function can be calculated in the vector processing engine. Similarly, since s is a normalized number, the subtraction can also be computed in the vector processing engine.

When computing the exponential function $2^x$, a denormalized result can occur if x has a value less than or equal to −126.0. As a practical matter, if x is less than −149.0, rounding to the nearest value returns a result of 0. Consequently, denormalized number handling occurs when x lies within the range $-149.0 \leq x \leq -126.0$. If x is greater than −126.0, then the value for $2^x$ is a normalized number. Utilizing this fact, the value for x is decomposed into two other values, x1 and x2, each of which returns a result that falls in the normalized range. Preferably, one of these values remains fixed, so that its exponential function can be computed once and stored for all subsequent operations on denormalized numbers. For example, x1 can be chosen to be equal to −64. In this case, the exponential function is computed as follows:

$$x2 = x - x1 \tag{14}$$

$$= x + 64 \tag{15}$$

$$2^x = 2^{(x1+x2)} \tag{16}$$

$$= 2^{x1} \cdot 2^{x2} \tag{17}$$

$$= 2^{-64} \cdot 2^{x2} \tag{18}$$

Both of these exponential functions can be separately calculated in the vector processing engine, since they each yield a normalized number. However, since the outcome of their multiplication is a denormalized number, the final step of adjusting the intermediate result $2^{x2}$ by taking its product with $2^{-64}$ is preferably performed in the scalar processing engine 12, to avoid flushing to zero.

In the foregoing example, the value for x1 was chosen as 64. In a 32-bit implementation, x1 can be any value that is greater than 23. Hence, the constant for x1 can be chosen to match any desirable implementation.

From the foregoing, therefore, it can be seen that the present invention provides a technique which enables denormalized numbers to be handled in a processor which does not include a hardware component dedicated to such numbers. This handling is accomplished by decomposing a denormal number into normalized numbers, and then operating upon the normalized numbers in a manner for which the processor is equipped. The result is then adjusted to account for the initial decomposition, as appropriate. Of particular significance is the fact that the same instruction set which is used for operations on normalized numbers is also employed in the handling of denormalized numbers. Hence, the need to create new, non-standardized instructions is avoided.

Figure 4:
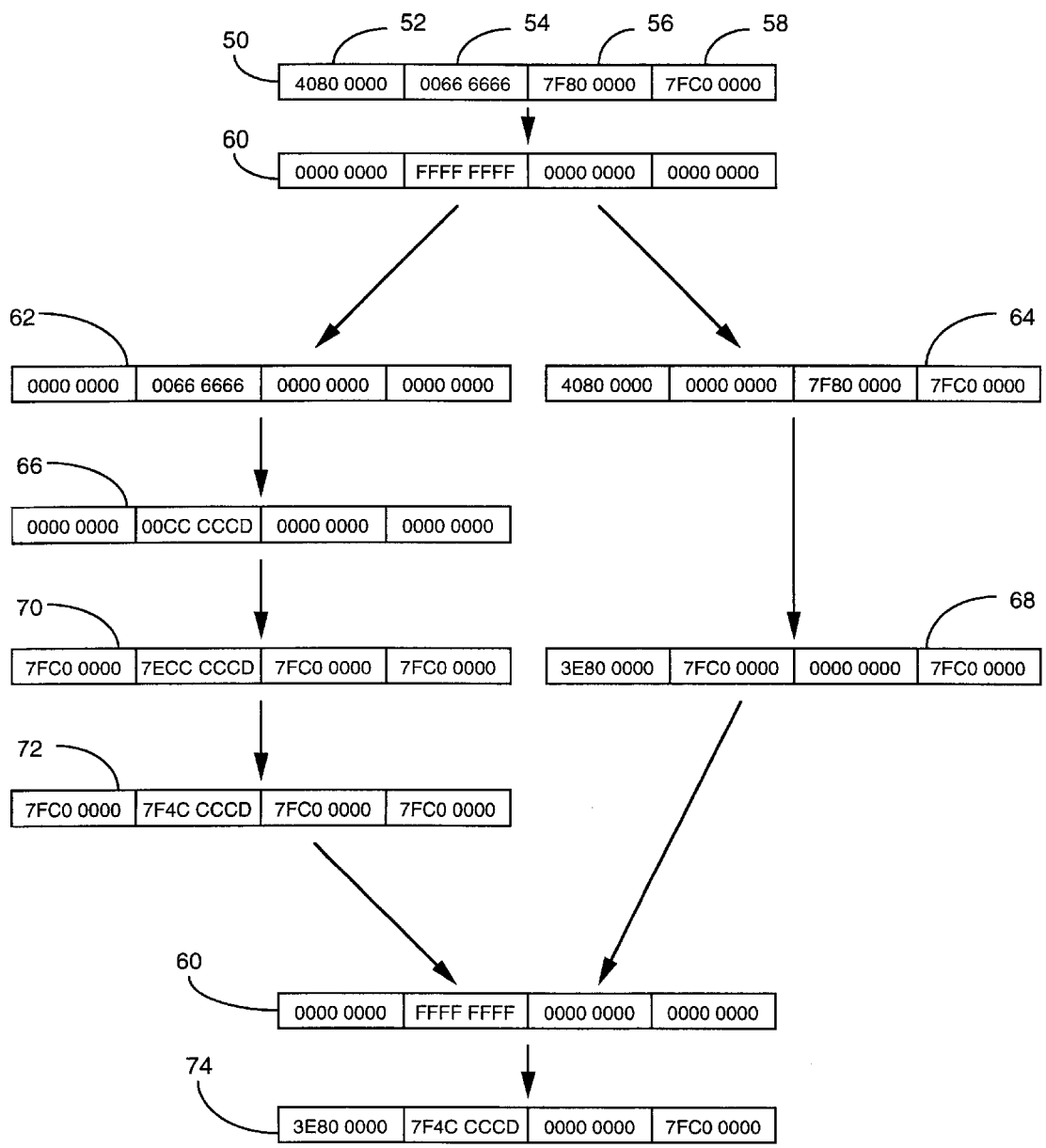
FIG. 4 depicts the manner in which denormalized numbers are handled during vector processing.

The manner in which the foregoing principles are applied during vector processing will now be described in greater detail with reference to the example illustrated in FIG. 4. This figure illustrates a register 50 containing a vector of four values on which an operation is to be carried out. For the sake of simplicity, the values are represented in hexadecimal notation in the figure. The examples in this vector represent the four types of values that can be encountered in floating-point arithmetic. The first value 52 is a normalized number. The second value 54 is a denormalized number, which is indicated by a biased exponent that is all zeroes and a non-zero significand. In this particular example, the denormalized number is equal to the value $A_2$ in Table 1. The third value 56 is infinity, which is indicated by an exponent that is all ones and a significand which is all zeroes. The fourth value 58 is known as "Not a Number", or NaN. This type of value represents the results of operations that cannot be represented as a number, such as dividing by zero, multiplying infinity by zero, taking the square root of a negative number, adding positive infinity to negative infinity, etc. This type of value is represented by an exponent that is all ones, and a significand which is non-zero.

As a first step, the denormalized values in the vector are identified, by determining those values which have a zero exponent and a non-zero significand. These values are then distinguished from all of the other types of values by means of a mask which is stored in another register 60. In the mask, the denormalized elements of the vector are indicated by all ones, and the other types of values are indicated by all zeroes. The mask is used to create two new vectors. Register 62 stores a vector which contains only the denormalized values in the original vector, and register 64 stores a vector which contains all of the other types of values.

The values in the register 62 are then scaled to provide denormalized numbers, which are stored in a register 66. In this example, the scaling factor is 2. The vectors in each of the registers 64 and 66 are then simultaneously processed in accordance with the desired operation, e.g. 1/x, and the results are stored in respective registers 68 and 70. The intermediate vector in register 70 is then adjusted in accordance with the scaling that was performed for the operation, e.g. multiply the result by 2, and stored in a register 72. Then, the vectors stored in registers 68 and 72 are merged, in accordance with the mask in register 60, to produce the final result, which is stored in a register 74.

Hence, the principles of the present invention can be integrated with conventional processes for handling non-denormalized numbers, to retain the benefits that arise from performing operations in a vector processing engine, while avoiding the undesirable consequences that arise when a flush-to-zero operation is employed as a default. While the example of FIG. 4 illustrates the handling of one denormalized value in a vector, it will be appreciated that any combination of normalized numbers, denormalized values and other types of values in a vector can be readily accommodated with this approach. Furthermore, although the figure illustrates an example in which the modified, or scaled, values are stored in a separate register 66 while the desired operation is performed, an alternative implementation would be to merge the values in the registers 64 and 66 prior to performing the operation, so that only a single instruction needs to be issued, rather than a separate instruction for each of registers 64 and 66.

It will be appreciated by those of ordinary skill in the art that the present invention can be embodied in other forms, without departing from the spirit or essential characteristics thereof. For example, a specific embodiment of the invention has been described in the context of a vectorized processor. However, the invention can be utilized in any type of processor which does not include an integral component for handling denormalized numbers. Furthermore, while the principles of the invention have been described in the context of specific numerical functions, such as reciprocal, reciprocal square root, exponential and logarithm, it will be appreciated that these principles are equally applicable to a variety of other numerical operations as well.

The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method for performing an operation within a processor, comprising the steps of:
    detecting whether a condition exists where at least one of a given input value, or an output value resulting from an operation on said given input value, lies within a range of denormalized numbers;
    scaling said given input value to produce a modified value which is a normalized number;
    performing said operation on said modified value using an instruction which is associated with normalized numbers, to produce an intermediate result; and
    adjusting said intermediate result in accordance with said scaling to produce a final result.

2. The method of claim 1 wherein said given input value is multiplied by a factor which is a power of two to produce said modified value.

3. The method of claim 2 wherein said power of two is determined on the basis of the number of leading zeroes in a binary representation of said given input value.

4. The method of claim 2 wherein said operation is the reciprocal of the square root of said given input value, and said adjusting step includes multiplying said intermediate result by the reciprocal of the square root of the inverse of said factor.

5. The method of claim 2 wherein said operation is the reciprocal of said given input value.

6. The method of claim 5 wherein said adjusting step includes multiplying said intermediate result by said factor.

7. The method of claim 5, further including the step of determining whether said given input value is less than a lower threshold, and producing a final result of infinity in lieu of said scaling, performing and adjusting steps.

8. The method of claim 5, further including the step of determining whether said given input value is greater than an upper threshold, and wherein said factor is a negative power of two when said given input value exceeds said upper threshold.

9. The method of claim 8 wherein said adjusting step includes multiplying said intermediate result by said factor when said given input value exceeds said upper threshold.

10. The method of claim 2 wherein said operation is the logarithm of the given input value, and said adjusting step includes subtracting a value equal to said power from said intermediate result.

11. The method of claim 1 wherein said operation is an exponential function, and said scaling step includes factoring said given input value into two numbers which are normalized numbers.

12. The method of claim 11 wherein one of said two numbers is a constant number that is used for all exponential functions that are performed on denormalized numbers.

13. A method for handling denormalized numbers in a vector processing engine which does not include a denormal processor, comprising the steps of:
examining a vector of input values to identify any values in said vector that are denormalized numbers, or that would result in denormalized numbers when a given operation is performed on them;
creating a mask that distinguishes the identified values from other values in the vector;
scaling the identified values to produce modified values;
performing said given operation on the modified values and said other values, to produce a vector containing an intermediate result; and
adjusting the value of said intermediate result in accordance with said mask, in a manner corresponding to said scaling, to produce a final result vector.

14. The method of claim 13 wherein said operation is performed simultaneously on said modified values and on said other values.

15. The method of claim 13 wherein said modified values are contained in a first vector, and said other values are contained in a second vector, and said vector containing said intermediate result is produced from said first vector.

16. The method of claim 13 wherein said other values include any one or more of normalized numbers, infinity and NaNs.

17. The method of claim 13 wherein said identified values are multiplied by a factor which is a power of two to produce said modified value.

18. The method of claim 17 wherein said power of two is determined on the basis of the number of leading zeroes in a binary representation of each identified value.

19. The method of claim 17 wherein said operation is the reciprocal of the square root of said given input value, and said adjusting step includes multiplying said intermediate result by the reciprocal of the square root of the inverse of said factor.

20. The method of claim 17 wherein said operation is the reciprocal of an input value.

21. The method of claim 20 wherein said adjusting step includes multiplying said intermediate result by said factor.

22. The method of claim 20, further including the step of determining whether an identified value is less than a lower threshold, and producing a final result of infinity in lieu of said scaling, performing and adjusting steps.

23. The method of claim 20, further including the step of determining whether a value in said vector of input values is greater than an upper threshold, and wherein said factor is a negative power of two when an input value exceeds said upper threshold.

24. The method of claim 23 wherein said adjusting step includes multiplying said intermediate result by said factor when said given input value exceeds said upper threshold.

25. The method of claim 17 wherein said operation is the logarithm of an input value, and said adjusting step includes subtracting a value equal to said power from said intermediate result.

26. The method of claim 13 wherein said operation is an exponential function, and said scaling step includes factoring an input value into two numbers which are normalized numbers.

27. The method of claim 26 wherein one of said two numbers is a constant number that is used for all exponential functions that are performed on denormalized numbers.

28. A computer-readable medium containing a program that executes the following steps:
detecting whether a condition exists where at least one of a given input value, or an output value resulting from an operation on said given input value, lies within a range of denormalized numbers;
scaling said given input value to produce a modified value which is a normalized number;
performing said operation on said modified value using an instruction which is associated with normalized numbers, to produce an intermediate result; and
adjusting said intermediate result in accordance with said scaling to produce a final result.

29. A computer-readable medium containing a program that executes the following steps:
examining a vector of input values to identify any values in said vector that are denormalized numbers, or that would result in denormalized numbers when a given operation is performed on them;
creating a mask that distinguishes the identified values from other values in the vector;
scaling the identified values to produce a vector containing modified values;
performing said given operation on the modified values and said other values, to produce a vector containing an intermediate result; and
adjusting values in said vector containing an intermediate result in accordance with said mask, in a manner corresponding to said scaling, to produce a final result vector.

30. A vector processing engine having associated therewith a set of instructions which perform the following actions:
examining a vector of input values to identify any values in said vector that are denormalized numbers, or that would result in denormalized numbers when a given operation is performed on them;
creating a mask that distinguishes the identified values from other values in the vector;
scaling the identified values to produce a vector containing modified values;
performing said given operation on the modified values and said other values, to produce a vector containing an intermediate result; and
adjusting values in said vector containing an intermediate result in accordance with said mask, in a manner corresponding to said scaling, to produce a final result vector.

31. The vector processing engine of claim 30 wherein said operation is performed simultaneously on said modified values and on said other values.

32. The vector processing engine of claim 30 wherein said modified values are contained in a first vector, and said other values are contained in a second vector, and said vector containing an intermediate result is produced from said first vector.

33. The vector processing engine of claim 30 wherein said other values include any one or more of normalized numbers, infinity and NaNs.

34. The vector processing engine of claim 30 wherein said identified values are multiplied by a factor which is a power of two to produce said modified value.

35. The vector processing engine of claim 34 wherein said power of two is determined on the basis of the number of leading zeroes in a binary representation of each identified value.

36. The vector processing engine of claim 34 wherein said operation is the reciprocal of the square root of said given input value, and said adjustment is carried out by multiplying said intermediate result by the reciprocal of the square root of the inverse of said factor.

37. The vector processing engine of claim 34 wherein said operation is the reciprocal of an input value.

38. The vector processing engine of claim 37 wherein said adjustment is carried out by multiplying said intermediate result by said factor.

39. The vector processing engine of claim 37, further including instructions for determining whether an identified value is less than a lower threshold, and producing a final result of infinity in lieu of said scaling, performing and adjusting actions.

40. The vector processing engine of claim 37, further including the instructions for determining whether a value in said vector of input values is greater than an upper threshold, and wherein said factor is a negative power of two when an input value exceeds said upper threshold.

41. The vector processing engine of claim 40 wherein said adjustment is carried out by multiplying said intermediate result by said factor when said given input value exceeds said upper threshold.

42. The vector processing engine of claim 34 wherein said operation is the logarithm of an input value, and said adjustment is carried out by subtracting a value equal to said power from said intermediate result.

43. The vector processing engine of claim 30 wherein said operation is an exponential function, and said scaling action includes factoring an input value into two numbers which are normalized numbers.

44. The vector processing engine of claim 43 wherein one of said two numbers is a constant number that is used for all exponential functions that are performed on denormalized numbers.

* * * * *